Patented Mar. 5, 1946

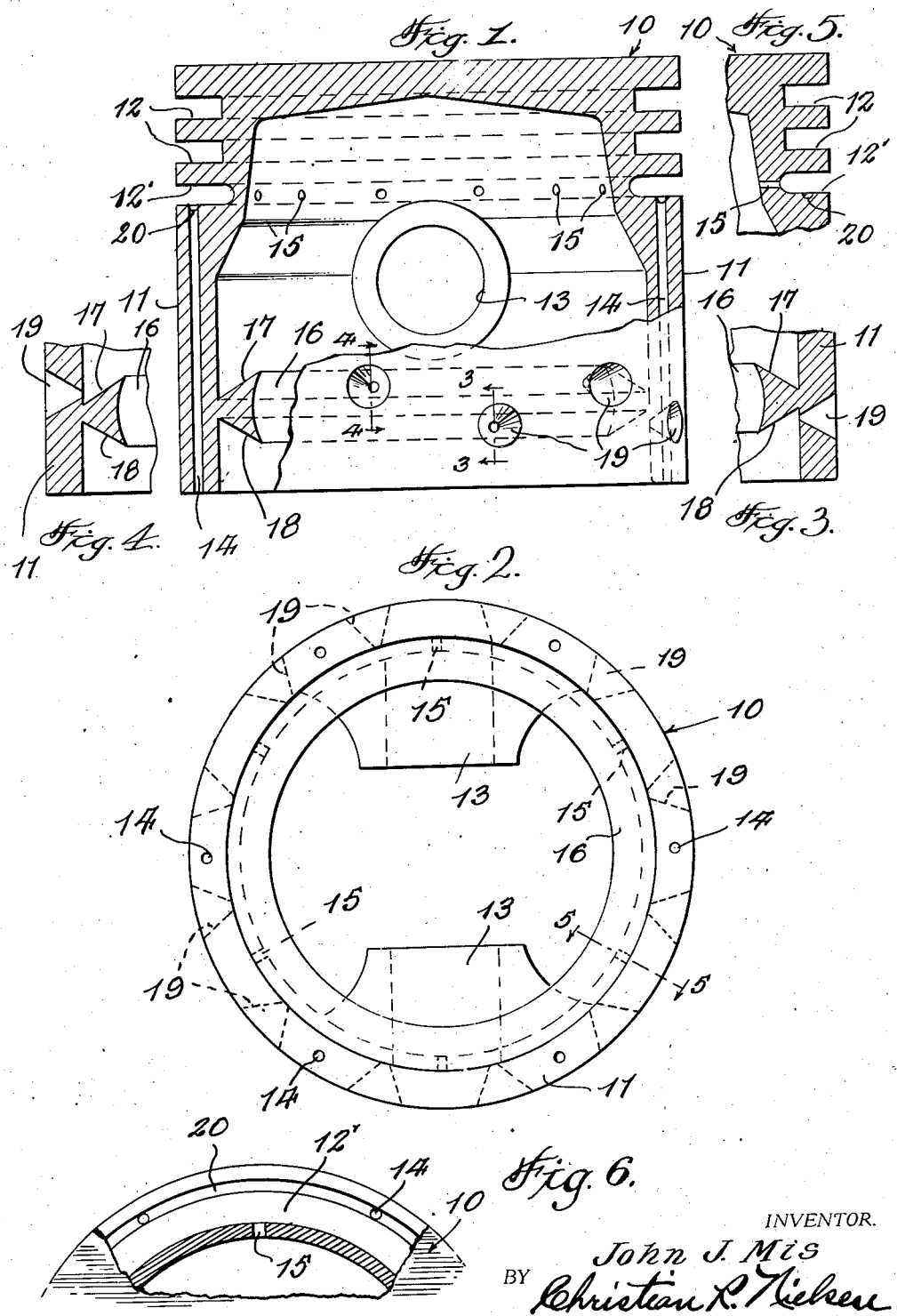

2,396,018

UNITED STATES PATENT OFFICE 2,396,018

PISTON CONSTRUCTION

John J. Mis, Chicago, Ill.

Application May 20, 1944, Serial No. 536,582

4 Claims. (Cl. 309—6)

This invention relates to a piston construction, such as employed in internal combustion engines or the like, and it consists in the constructions, arrangements and combinations herein described and claimed.

It is the particular object of the invention to provide a piston construction in which means are provided for uniformly lubricating the cylinder walls and piston under reciprocating movements of the piston.

More particularly it is an object of the invention to provide a piston in which a flange on the interior of the piston enables the catching of oil for distribution to the cylinder walls through suitably shaped ports formed in the skirt of the piston.

It is also an object of the invention to provide a novel lubricating means for the so-called "oil ring" of the piston.

Additional objects, advantages and features of invention will be apparent from the following description and accompanying drawing, wherein Figure 1 is a longitudinal section partly in elevation illustrating a piston constructed in accordance with my invention.

Figure 2 is a bottom plan view thereof.

Figure 3 is a section on the line 3—3 of Figure 1.

Figure 4 is a section on the line 4—4 of Figure 1.

Figure 5 is a fragmentary section of the piston on the line 5—5 of Figure 2.

Figure 6 is a fragmentary top plan view of the piston, partly in section.

There is illustrated a piston 10 of conventional form including a skirt portion 11 and ring grooves 12 and 12' and the usual bosses 13 for mounting of a wrist pin, as well understood.

The skirt 11, however, is of substantial thickness and at suitably spaced points circumferentially thereof a plurality of longitudinally extending ducts 14 are formed, opening upon the bottom of the skirt as well as upon the oil ring groove 12'.

A plurality of ports 15 are formed in the piston body adapted to register with the oil ring 12'.

At a point below the bosses 13 a flange 16 is formed as an integral part of the skirt of the piston. The flange projects from the wall of the piston a suitable distance, and is provided with upper and lower converging faces 17 and 18 respectively. The faces 17 and 18 function to direct oil toward the wall of the piston and in order that oil accumulated may be supplied to the cylinder wall of an engine, ports 19 are formed, spaced circumferentially around the skirt of the piston.

The ports 19 are positioned in staggered relation, as may be seen in Figures 1, 3 and 4, so that ports will open alternately upon the faces 17 and 18. Preferably the ports 19 are of conical shape, the apex of which is directed toward the faces 17 and 18.

A recess 20 is formed in the oil groove 12' extending circumferentially and connecting ducts 14.

In operation, when the piston moves upwardly oil will be caught upon the face 17 for discharge through the ports 19 which will deposit oil between the piston and cylinder wall. On the down stroke of the piston the face 18 functions in a like manner, it being understood that there is usually a dense oil vapor within the piston.

The ducts 14 function for removal of excessive oil on the cylinder wall and piston. The operation is substantially as follows: Normally there is a column of air and oil in the ducts 14 and when the piston is traveling toward the crank shaft, the oil ring located in the groove 12' collects oil which feeds in and around the ring and consequently fills the recess 20. As the piston gains acceleration in the first quarter of a cycle and in the second quarter of the cycle loses acceleration, the column of air and oil in ducts 14 will lubricate the cylinder and piston.

When the piston travels away from the crank shaft, the action in ducts 14 is stopped, since the oil ring bears upon the upper ends of the ducts 14, it being understood that the ports 15 functioning as air inlets, enabling the ducts 14 to operate as stated.

While I have shown and described a preferred construction, this is by way of illustration only, and I consider as my own all such modifications in construction as fairly fall within the scope of the appended claims.

I claim:

1. A piston for internal combustion engines and the like comprising a body having a skirt portion and an oil ring groove, ducts formed circumferentially on the skirt and opening upon the groove, a plurality of air vent ports between the oil ring groove and the interior of the body, said skirt having ports adjacent the lower end thereof and means on the interior of the skirt for feeding oil to said ports.

2. A piston for internal combustion engines and the like comprising a body having a skirt portion and an oil ring groove, longitudinal ducts between the lower end of the skirt and in communication with the oil groove, air vent ports formed in the oil ring groove in communication with the interior of the body, said skirt having a plurality of ports adjacent the lower end thereof, said ports being circumferentially spaced, and means on the interior of the skirt for catching oil for discharge into said last named ports upon reciprocation of the piston.

3. The structure of claim 2 in which the means for catching the oil consists of a flange having inwardly converging faces and said ports are positioned so as to open on said faces in alternate fashion.

4. The structure of claim 2 in which the ports of the skirt are of conical form, the apex being directed toward the interior of the skirt.

JOHN J. MIS.